Nov. 4, 1969    R. C. PATTERSON    3,476,341
LITTER BAG SUPPORT
Filed Sept. 27, 1967    2 Sheets-Sheet 1
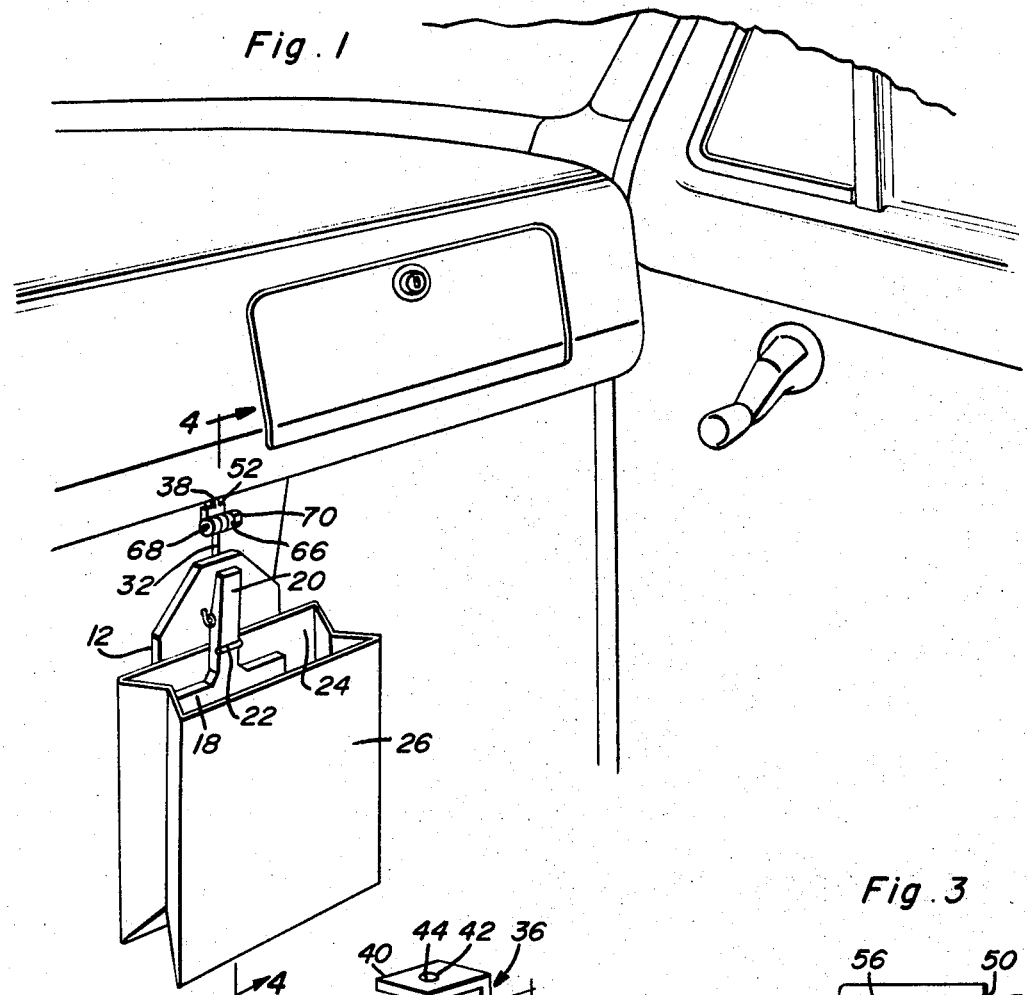
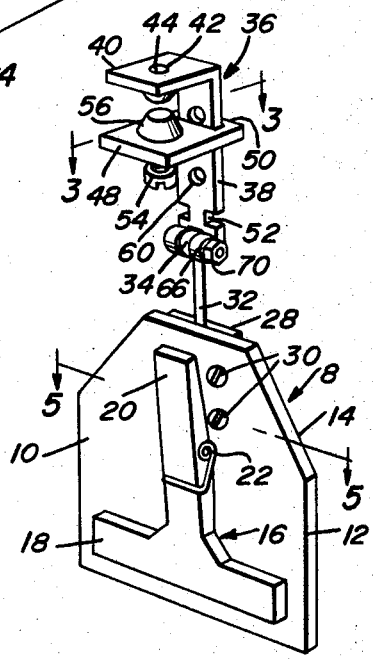
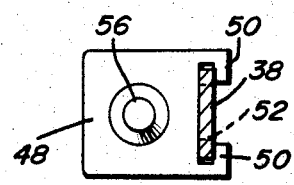
Robert C. Patterson
INVENTOR Nov. 4, 1969    R. C. PATTERSON    3,476,341
LITTER BAG SUPPORT
Filed Sept. 27, 1967    2 Sheets-Sheet 2
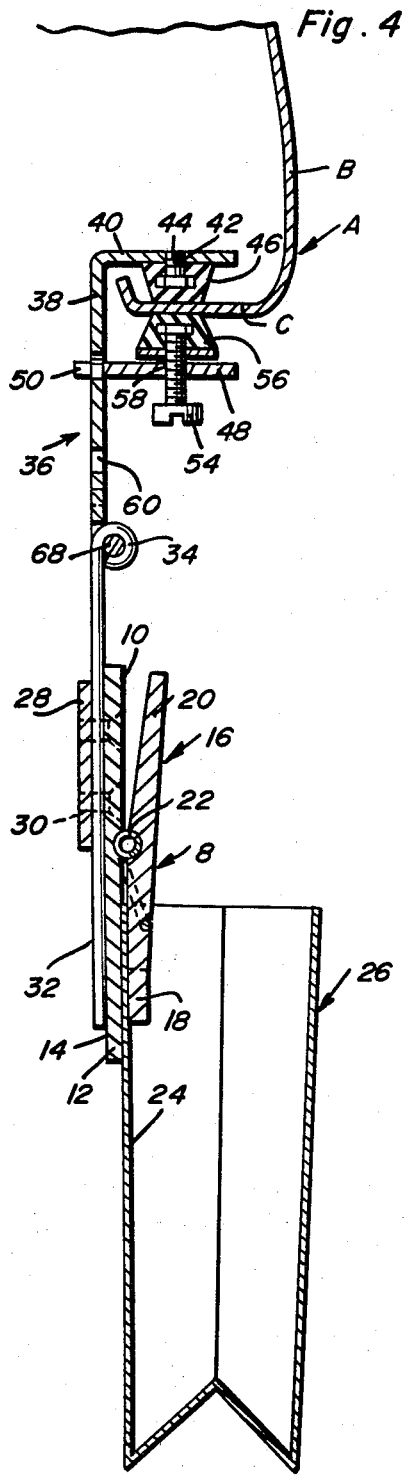
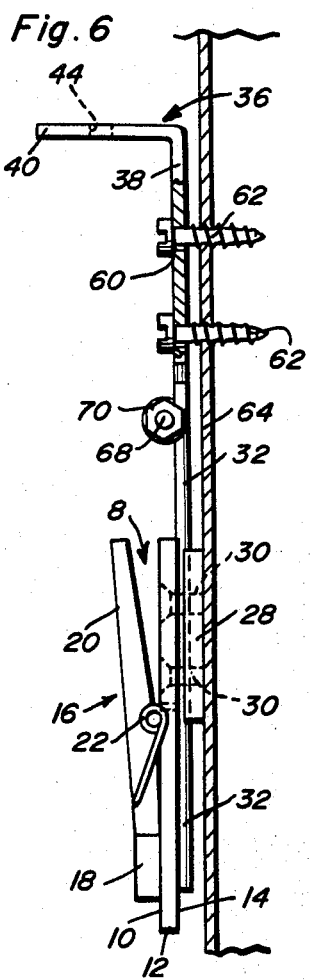
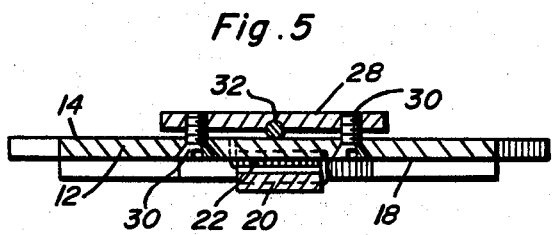
Robert C. Patterson
INVENTOR.

United States Patent Office 3,476,341
Patented Nov. 4, 1969

3,476,341
LITTER BAG SUPPORT
Robert C. Patterson, 2033 Marilyn Lane,
Arlington, Tex. 76010
Filed Sept. 27, 1967, Ser. No. 670,989
Int. Cl. B65b 67/12; A47f 5/00
U.S. Cl. 248—95                                8 Claims

ABSTRACT OF THE DISCLOSURE

A device which is designed and adapted to suspend a disposable litter bag in a vehicle, train, airplane or similar conveyance. It is aptly usable on a hospital bed, in one's bathroom, kitchen, office or elsewhere. Inasmuch as it embodies a (1) clipboard, (2) an attaching bracket and (3) a rod linking the clipboard to the bracket, the clip on the board or plate lends itself to use in removably clipping letters, notes, cards, bills and so on. The bracket means can be mounted on horizontal, vertical and in-between inclined surfaces.

---

The present invention relates to said new and useful improvements in an article support and pertains, more particularly, but not necessarily, to a support which is expressly designed and adapted to clip and suspend an open mouth disposable plastic or equivalent litter bag in an automobile or equivalent conveyance or wherever a bag or similar small article is used. As will be evident from the description thus far given the support is not to be restricted to use as a hanger and support for litter bags and the like. As a matter of fact, the device embodies, as one of its features, a simple, practical and easy-to-use clipboard and novel means for suspending and bracketing the same on a relatively stationary support surface. It follows that the board or plate part of the clipboard has a smooth flat front surface with the spring-biased end of a pivoted clip cooperable therewith and may accordingly be aptly used for accessibly clipping letters, bills, cards and the like in lieu of the aforementioned litter bag.

Briefly, the over-all device is characterized, generally construed, by an adapter unit embodying bracket means, a clipboard constituting a bag holder unit, and a third unit therebetween which serves to link and hingedly and adjustably join the adapter unit and bag holder unit in cooperable relationship.

One improvement has to do with the aforementioned clipboard. This comprises a board, plate or panel having a flat front face and a pivoted spring biased clip thereon, the clip being preferably T-shaped to better achieve the end result desired. The rear side of the plate is provided with an auxiliary plate which is held in place by screw-threaded fasteners and which serves to accommodate a cooperating portion of a rod. The rod is sandwiched between the two plates and consequently the clipboard as a unit can be slid up and down on the rod or rotated around the rod throughout a circle of 360°.

Another improvement resides in employing a substantially L-shaped bracket whose short arm provides a jaw and whose long arm is provided with an attachable and adjustable cleat which serves as a second jaw. To the ends desired the long leg of the bracket is capable of being secured by screwthreaded fasteners, nails or the like on vertical, horizontal and inclined support surfaces.

Further, novelty is predicated on the hinge means which provides a connection between the coacting ends of the long leg of the bracket and the aforementioned rod. This means serves not only as a hinge but embodies a nut and bolt and can therefore be clamped. Accordingly, it is possible to move the clipboard, bag and rod to any given position and then fasten and retain it in that position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view showing a fragmentary portion of an automobile and likewise a portion of the instrument panel and, what is more significant, the aforementioned clipboard with the clip fastening a disposable litter bag in a ready-to-use position.

FIG. 2 is a view in perspective of the litter bag support or device by itself, that is, with the bag omitted.

FIG. 3 is a horizontal section taken on the plane of the section line 3—3 of FIG. 2 looking in the direction of the arrows.

FIG. 4 is a view on an enlarged scale taken approximately on the plane of the section line 4—4 of FIG. 1.

FIG. 5 is an enlarged horizontal section on the line 5—5 of FIG. 2.

FIG. 6 is a view similar to FIG. 4 but with parts in section and elevation and which shows the cleat omitted and also shows how the long leg of the bracket is screwed or otherwise mounted for use on a support surface, for example, the vertical support surface shown.

With reference now to FIG. 2 in particular it will be evident that the aforementioned bag holder unit comprises a simple clipboard which is denoted generally by the numeral 8. More specifically the unit comprises a board, panel or plate of appropriate size and material and which may be of the general rectangular shape shown. The front smooth surface of this plate is denoted by the numeral 10. The plate proper is denoted by the numeral 12 and the rear surface, which may be flat, is denoted by the numeral 14. The spring loaded or spring biased article retaining clip is denoted by the numeral 16 and it is preferably T-shaped. The head portion 18 of the T is constructed and arranged to cooperate with the surface 10. The stem of the T is denoted at 20 and it is pivotally connected by spring means 22 to facilitate opening and closing the clip. A clip of this type lends itself to conveniently and satisfactorily fastening the wall portion 24 of the litter bag 26 in the manner shown for example in FIGS. 1 and 4. The rear side of the plate as denoted at 14 in FIG. 5 is provided with a relatively small auxiliary plate 28 which is detachably and adjustably mounted in place by way of assembling and retaining screws or equivalent fasteners 30. The two plates 12 and 28 thus assembled serve to accommodate the cooperating portion 32 of a suspension unit, more particularly an elongated round rod. With the construction shown in FIGS. 4 and 5 it will be evident that by loosening the screws 30 it is possible to adjust the entire clipboard up or down on the rod. Also, it is possible to rotate it bodily throughout a circle of 360° and then fasten it in a set position. The upper end of this rod as shown in FIG. 4 is bent upon itself to provide an attaching and hinging eye 34.

Referring now to the aforementioned adapter unit this is denoted by the numeral 36. This unit 36 is alternately referred to as bracet means and more specifically, it comprises an L-shaped rigid metal or equivalent strap which embodies a long leg 38 and a short leg 40. The short leg provides a jaw when the device is used in conjunction with the automobile instrument panel A, as shown in FIG. 4. In this connection the depending skirt portion of the instrument panel has a substantially horizontal flange C and it is above flange C that jaw 40 extends. In practice it is desirable to provide a screwthreaded hole at 42 and to screw a stud 44 into the hole, said stud having a head which is anchored in a compressibly resilient button-like detent 46. The relatively movable jaw comprises a simple rectangular cleat 48 of the construction perhaps best shown in FIGS. 2 and 3. The attachable end portion of the plate is provided with hooks 50 which slidingly engage edge portions of the long leg. The lower part of the leg is provided with clearance notches 52 which as shown in FIG. 2 permit the user to attach and detach the cleat in what is believed to be a self-evident manner. The cleat is provided with a setscrew 54 the head portion of which is embedded in a rubber or compressibly resilient button-like detent 56 which cooperates with the aforementioned detent 46. The shank of the screw is threaded through a screwthreaded hole 58 provided therefor in the cleat. When the jaws are in the position shown in FIG. 4 the detents 46 and 56 are above and below and serve to clamp the flange C between themselves. It is within the purview of the invention to bodily remove the jaw or cleat 48 and in fact to also detach the button detent 46 in the manner shown in FIG. 6. As illustrated in this view the long leg of the bracket is provided with bolt holes 60 which serve to accommodate screwthreaded headed fasteners 62 which can be employed in the manner shown to fasten the leg or bracket to the vertical support 64. It is reiterated here that because of this construction it is permissible to use the bracket on a vertical support, a horizontal support as shown in FIG. 4 for example and other horizontal supports not shown. In fact, the construction is such that the bracket can be satisfactorily attached to and hung from other inclined support surfaces between horizontal vertical.

Referring again to the leg 38 and more particularly to FIG. 2 it will be noted that the extreme lower end of the leg below the notches 52 is provided with a pair of spaced aligned hinge knuckles 66 between which the aforementioned knuckle 34 can be placed. When the several knuckles are lined up a bolt is passed therethrough. This is to say the stem 68 of the bolt is passed through the knuckles with the head at one end as shown in FIG. 1 and with an assembling and retaining nut 70 at the other end. It follows that the hanger rod or link is not only a suspending and uniting connection between the bracket means 36 and clipboard means 8, the bolt and nut means enables one to achieve the hinged placement of the clipboard that may be desired after which the position can be set by tightening the nut 70.

It will be evident that by using a clipboard of the type shown and described it is possible to clasp all sorts of containers which are capable of use as makeshift litter bags. For example, experience has shown that one can use cut off milk cartons, paper cups, paper bags, cloth bags or whatever may be at hand for the purposes needed. It follows that the invention will serve the purposes for which it is intended. Accordingly, a more extensive description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in conjunction with attachable and detachable litter bags, refuse receptacles, small article containers and the like, a bag support comprising, an adapter unit embodying a bracket designed and adapted to be retentively attached to a relatively stationary support surface, a holder unit complemental to said adapter unit and embodying a plate having a surface equipped with a spring-biased bag positioning clip, and complemental means providing an assembling and adjusting connection between adjacent coacting end portions of said adapter unit and holder unit, respectivel, said means comprising a rod, said rod being straight and circular in transverse cross-section and linking and connecting said adjacent coacting end portions, said rod having one end detachably clampingly hinged to an oriented component part of said bracket and its other end detachably adjustably clamped to said plate in a manner permitting the plate to be (1) shifted and adjusted longitudinally along said rod and (2) angularly adjustably rotated about the long axis of said rod.

2. The bag support defined in and according to claim 1, and wherein said bracket is L-shaped and embodies a short leg which provides a jaw and a long leg which is capable of serving as a hanger for said holder unit and is also usable as an attaching and anchoring member and is accordingly provided with suitable holes for passage of nails or screwthreaded headed fasteners.

3. The bag support defined in and according to claim 1, and wherein said holder comprises a clipboard wherein said plate has a smooth flat front surface ample in area to retentively base a wall portion of a bag flatwise thereon, said clip being pivotally mounted on said flat surface at a given place and to facilitate clasping said wall portion in a manner to suspend the bag with the mouth of the bag unobstructedly open for use without hindrance and to expedite the steps of attaching and detaching said bag.

4. The bag support defined in and according to claim 3 and wherein said clip is T-shaped, the head of the T providing the desired bag clasp and the stem of the T providing a finger-piece.

5. The bag support defined in and according to claim 4 and wherein the rear surface of said plate is provided with a relatively small auxiliary clamping plate which is fastened to said rear surface by screws, and that portion of the rod which is cooperable with said plate is sandwiched between the latter and auxiliary plate in a manner to accomplish the aforementioned adjustments.

6. The bag support defined in and according to claim 2, and wherein said long leg is provided with a cleat which is similar in size and shape to said short leg, constitutes a second jaw, is slidable on said long leg toward and from said first mentioned jaw, and is bodily attachable to and detachable from said long leg.

7. The bag support defined in and according to claim 6, and wherein said jaws have confronting gripping surfaces, said surfaces being provided with aligned compressibly resilient button-like detents, the detent on said cleat being carried by a setscrew and said setscrew being carried by and adjustably mounted on said cleat.

8. A bag support of the class described comprising, in combination, a clipboard comprising a flat-faced plate having front and rear surfaces, a substantially T-shaped spring-biased clip pivotally mounted on said front surface in a position and manner to detachably clasp a bag, an auxiliary plate cooperable with the rear surface of said plate, an elongated linking rod having a portion interposed between opposed surfaces of said first named plate and auxiliary plate and clamped in a set position by headed screw-threaded fasteners detachably and adjustably mounting said auxiliary plate in place on said rear surface, an adapter unit embodying an L-shaped bracket having adjustable jaws and at least one leg, and means hingedly and adjustably joining one end of said rod to a cooperating end of said leg.

References Cited

UNITED STATES PATENTS

| | | | |
|---|---|---|---|
| 936,254 | 10/1909 | Parsons | 248—226 |
| 1,026,506 | 5/1912 | Hard | 248—226 X |
| 1,112,306 | 9/1914 | Mahan | 248—226 X |
| 2,551,157 | 5/1951 | Price | 248—226 X |
| 2,884,174 | 4/1959 | Davitt | 248—95 X |
| 3,083,427 | 4/1963 | Grenon | 24—66 X |
| 3,138,361 | 6/1964 | Meldrum | 248—95 |
| 1,178,072 | 4/1916 | Hoag | 248—480 X |

CHANCELLOR E. HARRIS, Primary Examiner

U.S. Cl. X.R.

24—66; 248—226